(12) United States Patent
Lee et al.

(10) Patent No.: US 8,194,619 B2
(45) Date of Patent: Jun. 5, 2012

(54) TERMINAL IN WIRELESS COMMUNICATION SYSTEM AND RANGING METHOD THEREOF

(75) Inventors: Nam-Suk Lee, Cheollabuk-do (KR); June-Bae Seo, Daejeon (KR); Nam-Hoon Park, Daejeon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd, Seoul (KR); KTFreetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 515 days.

(21) Appl. No.: 11/720,921

(22) PCT Filed: Sep. 8, 2005

(86) PCT No.: PCT/KR2005/002971
§ 371 (c)(1),
(2), (4) Date: Jun. 22, 2009

(87) PCT Pub. No.: WO2006/062286
PCT Pub. Date: Jun. 15, 2006

(65) Prior Publication Data
US 2009/0296661 A1 Dec. 3, 2009

(30) Foreign Application Priority Data
Dec. 7, 2004 (KR) .................. 10-2004-0102401

(51) Int. Cl.
*H04B 7/216* (2006.01)

(52) U.S. Cl. .............. 370/335; 370/252; 370/479
(58) Field of Classification Search .......... 370/252, 370/335, 479
See application file for complete search history.

(56) References Cited

U.S. PATENT DOCUMENTS
2001/0000959 A1* 5/2001 Campana, Jr. ............. 340/573.1

FOREIGN PATENT DOCUMENTS
| EP | 1 458 210 A1 | 9/2004 |
| KR | 1020030064219 A | 7/2003 |
| KR | 1020030084243 A | 11/2003 |

OTHER PUBLICATIONS

Xiaoyu Fu et. al, "Initial Uplink synchronization and Power Control (Ranging Process) for OFDMA Systems" IEEE Communications Society Globecom 2004, pp. 3999-4003, Nov. 29-Dec. 3, 2004.

* cited by examiner

*Primary Examiner* — Jason Mattis
(74) *Attorney, Agent, or Firm* — Jefferson IP Law, LLP (57) ABSTRACT

A ranging method of an access terminal comprising receiving and analyzing UL-MAP/DL-MAP; selecting a given uplink sub-channel number and a symbol number from the UL_MAP when a ranging event is generated; requesting a ranging process by transmitting a CDMA code; receiving a ranging response message broadcasted from the access point; extracting a CDMA code, a sub-channel number, and a symbol number from the received ranging response message, comparing the extracted result and the stored ranging parameters, and adjusting transmission power, timing, and frequency offset on the basis of the extracted result or discarding the ranging response message; and terminating a ranging response message receipt operation.

18 Claims, 11 Drawing Sheets

TERMINAL IN WIRELESS COMMUNICATION SYSTEM AND RANGING METHOD THEREOF

TECHNICAL FIELD

The present invention relates to a wireless communication system, and more particularly to a terminal in a wireless portable Internet system and a ranging method thereof.

BACKGROUND ART

In a wireless communication system, the wireless portable Internet is a next-generation communication system that supports mobility and local area data communication such as in a conventional wireless local access network (LAN) that uses a fixed access point.

In such a wireless portable Internet system, an access terminal (AT) requires a ranging process to access an access point (AP). The ranging process controls transmission power, timing, and frequency offset on uplink so that the AP can receive data from the AT without an error. Thus, the AT periodically transmits a Code Division Multiple Access (CDMA) code to the AP, and the AP estimates values of the transmission power, timing, and frequency offset while receiving the CDMA code, adjusts the estimated values to be within a range for accurate data receipt, and transmits the adjusted values to the AT.

In more detail, the ranging process is broadly divided into an initial stage and an adjusting stage. During the initial stage, the AT selects a resource from among uplink resources provided by the AP and initially accesses the AP by transmitting a CDMA code assigned to the AT to the AP through the selected resource. During the adjusting stage, the AT receives and processes the RNG_RSP message transmitted from the AP that has received the CDMA code to adjust transmission power, timing, and frequency offset on the uplink. The AT periodically performs the initial stage and the adjusting stage at regular intervals.

However, the number of RNG_RSP messages broadcasted by the AP in response to the CDMA code for the ranging process increases as the number of ATs that access the AP increases. As a result, the number of messages processed by the AT increases. In other words, the AT receives and processes all RNG_RSP messages broadcasted from the AP, and thus a load of the AT is increased.

DISCLOSURE OF INVENTION

Technical Problem

It is an advantage of the present invention to provide an efficient ranging process of an access terminal in a wireless portable Internet system.

In particular, a purpose of the present invention is to reduce a load of the access terminal in receiving and processing a ranging response message broadcasted from an access point.

In addition, another purpose of the present invention is to provide a more efficient ranging process by defining interfaces between each component of an access terminal in great detail.

Technical Solution

In one aspect of the preset invention, there is provided a ranging method of an access terminal that requests a ranging process from an access point through a wireless network and performs the ranging process according to a corresponding response of the access point. The ranging method includes a) receiving and analyzing a UL-MAP provided from the access point, and extracting information on an uplink resource allocated to the access terminal; b) selecting an uplink sub-channel number and a symbol number from the UL-MAP when a ranging event is generated; c) requesting a ranging process by transmitting a Code Division Multiple Access (CDMA) code including the symbol number to the access point through the selected sub-channel number, and storing the sub-channel number, the symbol number, and the CDMA code as ranging parameters; d) receiving a ranging response message broadcasted from the access point; e) extracting a CDMA code, a sub-channel number, and a symbol number from the received ranging response message, comparing the extracted result with the stored ranging parameters, and controlling transmission power, timing, and frequency offset on the basis of the extracted result when the extracted result and the stored ranging parameters are the same; f) extracting a CDMA code, a sub-channel number, and a symbol number from the received ranging response message, comparing the extracted result with the stored ranging parameters, and discarding the received ranging response message when the extracted result and the stored ranging parameters are not the same; and g) terminating the ranging response message receipt operation and performing a) through f) when a ranging response message of which ranging parameters are identical to the stored ranging parameter is not received after a predetermined time.

In another aspect of the present invention, there is provided an access terminal that requests a ranging process from an access point through a wireless network and performs the ranging process according to a corresponding response of the access point. The access terminal includes a transceiver, a MAP processor, and a Media Access Control (MAC) controller. The transceiver performs signal transmission/receipt with the access point through the wireless network. The MAP processor receives and analyzes a UL_MAP from the access point to extract information on an unlink resource allocated to the access terminal, and transmits a given CDMA code to the access point through the transceiver according to a ranging code transmission request message. The MAC controller generates a ranging event, selects a given uplink sub-channel number and a symbol number from the UL_MAP according to generation of the ranging event, and outputs the CDMA code and a ranging code transmission request message. The MAC controller terminates a ranging response receipt operation when a ranging response message for the ranging process request is not received from the access point for a predetermined time, and performs a ranging request operation by transmitting the CDMA code to the access point.

Advantageous Effects

According to embodiments of the present invention, an efficient ranging process can be realized in a wireless portable Internet system.

In particular, the efficient ranging process can be realized by defining a process of each component for a ranging process and an interface between each component. In addition, a load for processing a ranging response message in an access terminal can be greatly reduced by receiving the ranging response message only for a predetermined period of time.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive.

An access terminal (AT) transmits a CDMA code to an access point (AP), and activates a transceiver for a predetermined time period or until the AT receives and processes a ranging response (RNG_RSP) message from the AP. Otherwise, it is deactivated to reduce a load in receiving and processing the RNG_RSP message to thereby realize an effective ranging process, according to an embodiment of the present invention.

The following embodiments of the present invention mainly focus on a ranging process performed by an access terminal in a wireless portable Internet system, but are not restricted to the wireless portable Internet system. The ranging process of the access terminal may be applied to various wireless communication systems.

Figure 1:
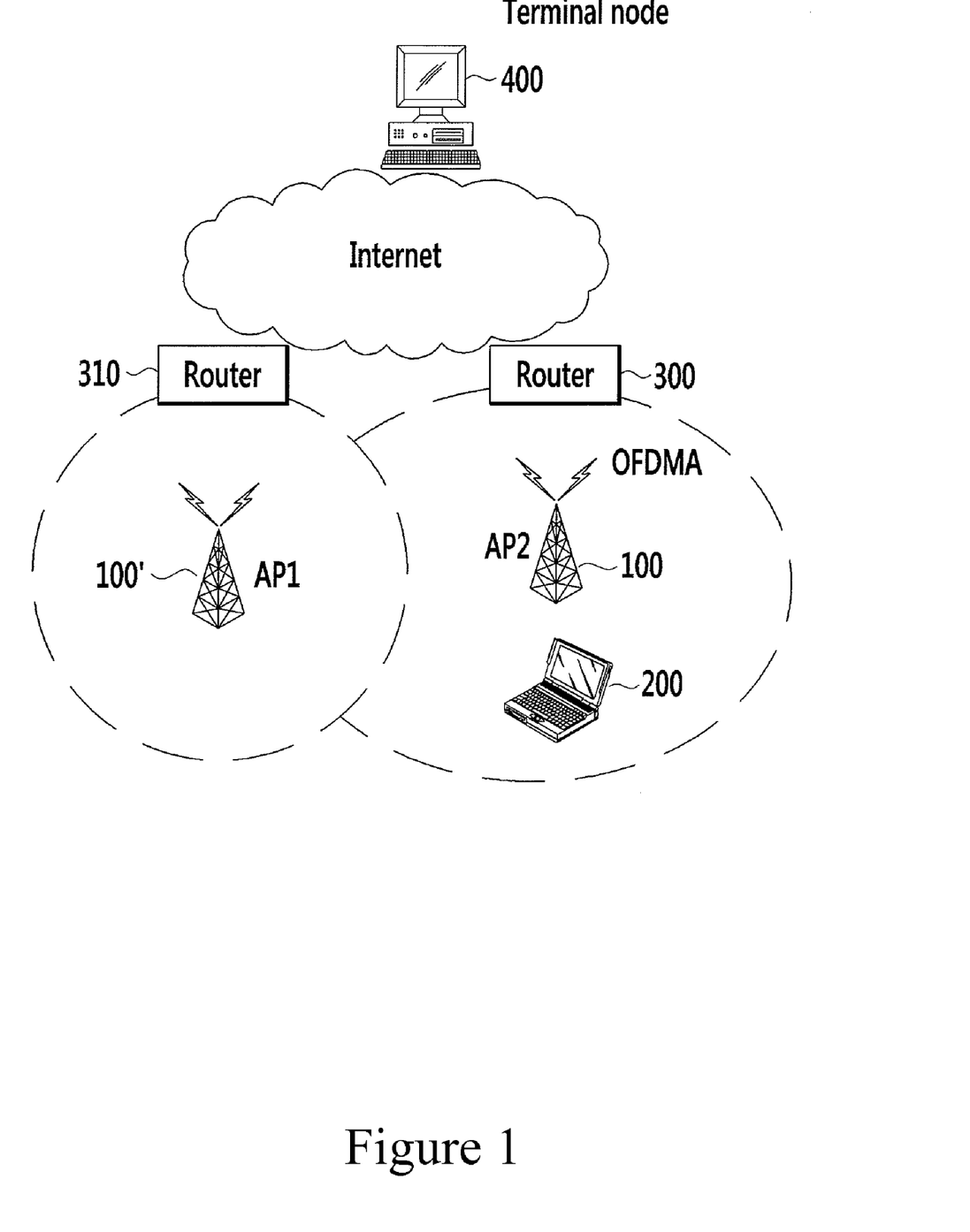
FIG. 1 is a schematic diagram illustrating an outline of a wireless portable Internet according to an embodiment of the present invention.

FIG. 1 schematically illustrates a structure of a wireless portable Internet system according to an embodiment of the present invention.

The wireless portable Internet system includes access points (AP) 100 and 100' as base stations, an access terminal (AT) 200 wirelessly accessing the AP, routers 300 and 310 accessing the AP through a gateway, and an Internet.

The wireless portable Internet system supports mobility of the AT 200 to provide a seamless data communication service when it moves from one cell covered by a first AP 100 to another cell covered by a second cell AP 100', supports a handover, and allocates dynamic IP addresses as the AT 200 moves.

Figure 2:
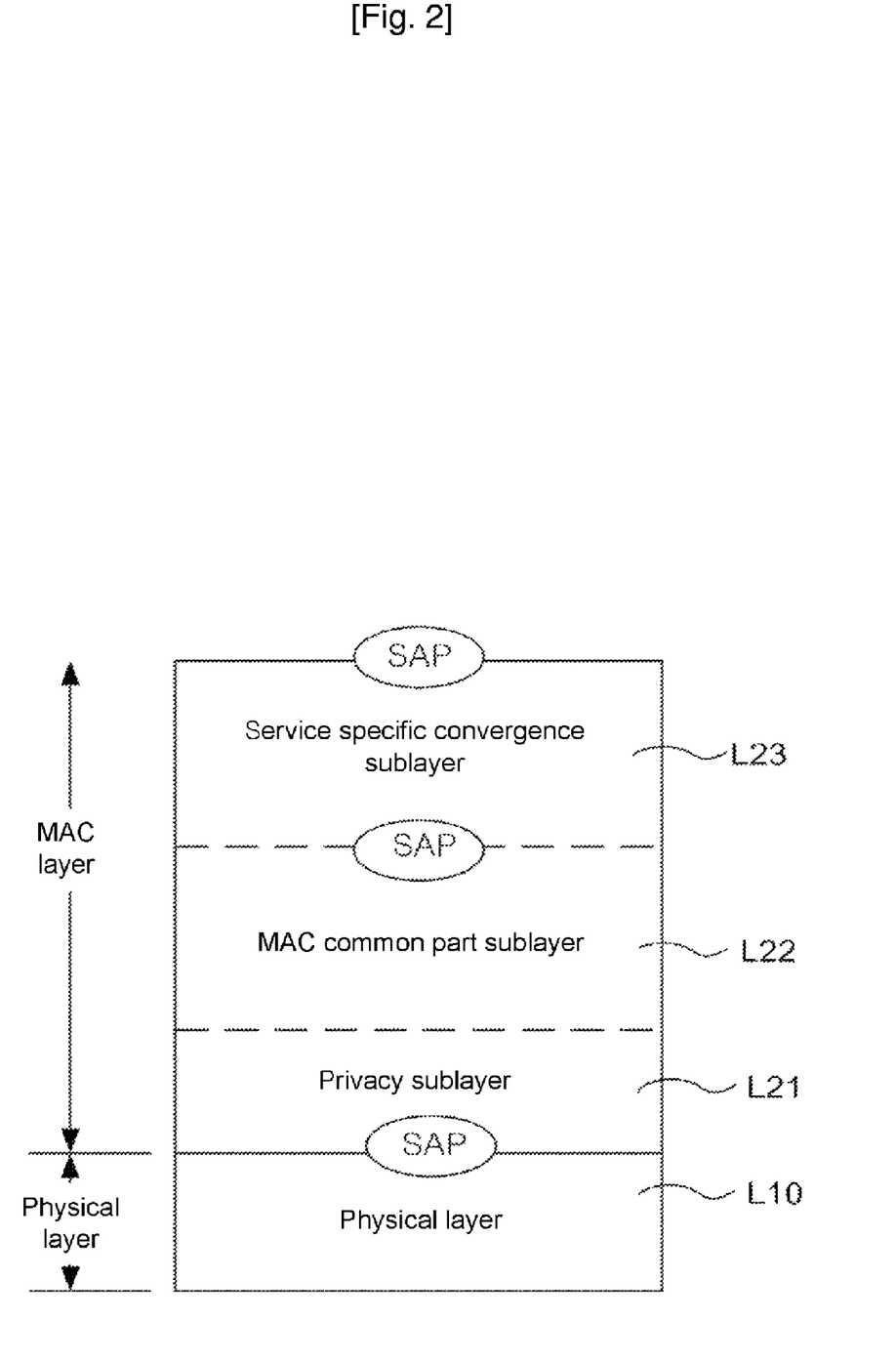
FIG. 2 is a hierarchical diagram of a hierarchical structure of a wireless portable Internet system.

FIG. 2 is a hierarchical view illustrating a hierarchical structure of a wireless portable Internet system according to an embodiment of the present invention.

A hierarchical structure of the IEEE 802.16e wireless portable Internet system includes a physical layer L10, and medium access control (MAC) layers L21, L22, and L23. The physical layer L10 performs wireless communication functions such as modulation/demodulation and coding/decoding, etc.

According to the IEEE 802.16e, the wireless portable Internet system does not have function-specific MAC layers as does a wired Internet system, but a single MAC layer is in charge of different functions. The MAC layer includes a privacy sub-layer L21, a MAC common part sub-layer L22, and a service specific convergence sub-layer L23.

The service specific convergence sub-layer L23 performs payload header suppression and quality of service (QoS) mapping functions in consecutive data communication.

The MAC common part sub-layer L22 is the core of the MAC layer which is in charge of system access, bandwidth allocation, connection establishment and maintenance, and QoS control.

The privacy sub-layer L21 performs functions of equipment authentication and security key exchange, and encryption. The equipment authentication is carried on by the privacy sub-layer L21, and the user authentication by an upper layer of the MAC (not shown).

Figure 3:
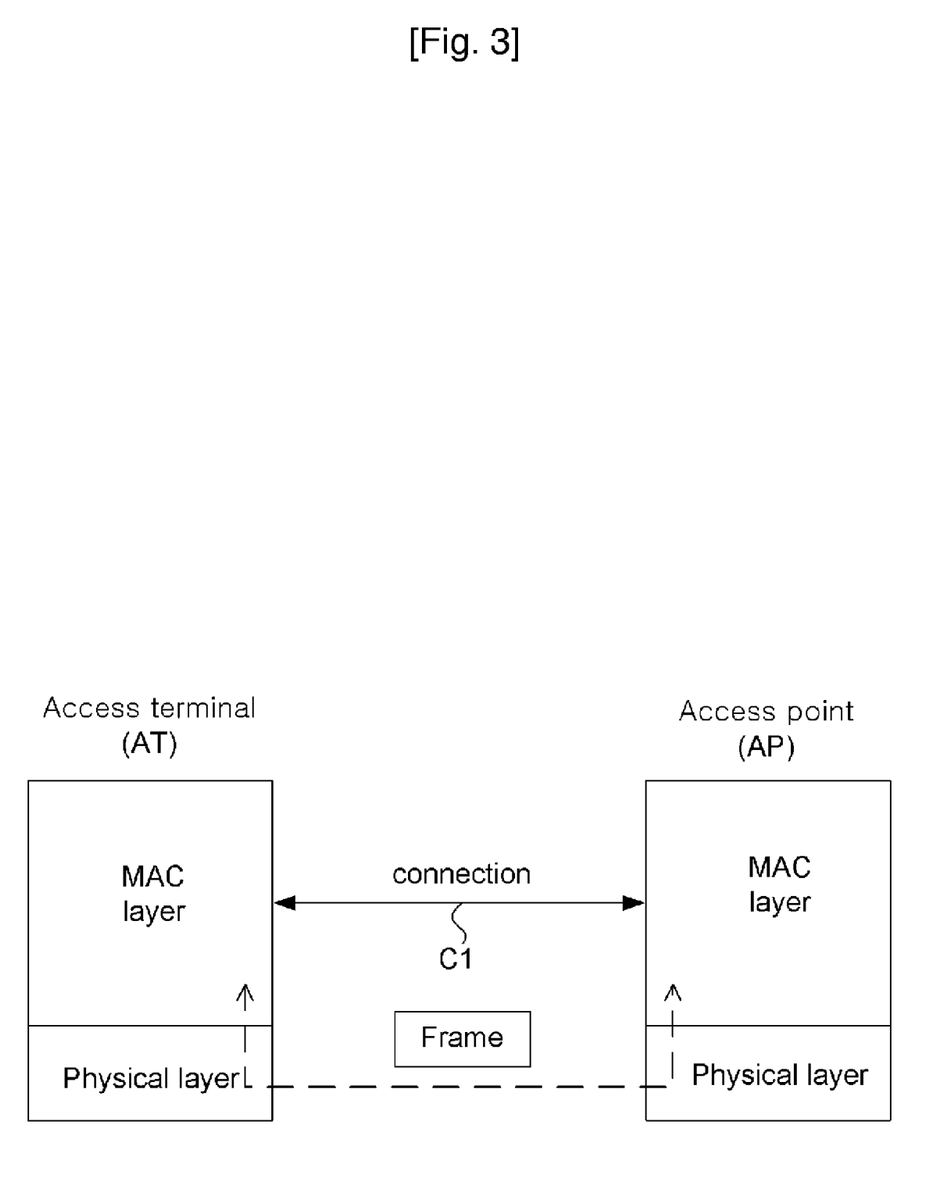
FIG. 3 schematically illustrates a connection structure between an access point and an access terminal in a wireless portable Internet system.

FIG. 3 shows a schematic diagram of a connection structure between an AP and an AT in the wireless portable Internet system.

A connection is provided between the MAC layers of the AT and the AP. The term "connection C1" as used herein does not refer to a physical connection, but to a logical connection that is defined as a mapping relationship between the MAC peers of the AT and the AP for traffic transmission of one service flow.

Hence, the parameter/message defined on the connection C1 refers to a function executed between the MAC peers. Actually, the parameter/message is processed into a frame, which is transferred through the physical layer and analyzed so as to control the MAC layer to execute a function corresponding to the parameter/message. A MAC message transferred through the connection C1 includes a connection identifier (CID) which is a MAC layer address for identifying the connection; UL_MAP and DL_MAP for identifying a symbol offset and a sub-channel of a burst time-divided by an AT in a downlink/uplink, and defining a number of symbols of the allocated resource and a number of sub-channels; and channel descriptors (including a downlink channel descriptor DCD) and an uplink channel descriptor UCD) for describing a characteristic of a physical layer according to characteristics of the downlink/uplink. In addition, the MAC message includes various messages for performing request (REQ), response (RSP), and acknowledgement (ACK) for various operations.

Figure 4:
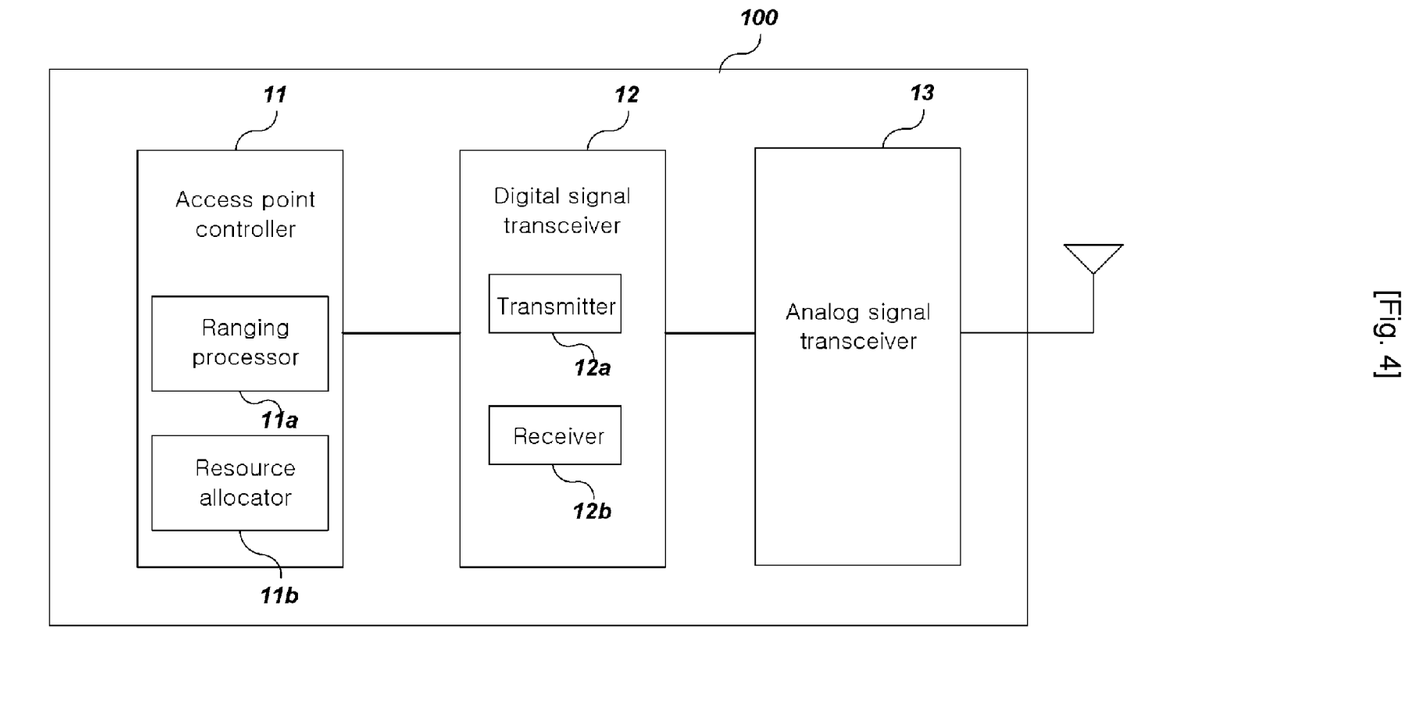
FIG. 4 is a structural diagram of an access point according to an embodiment of the present invention.

FIG. 4 shows a block diagram of an AP in the above-structured wireless portable Internet system according to an exemplary embodiment of the present invention.

The AP receives and processes a ranging request from an AT. The AP 100 includes an access point controller 11, a digital signal transceiver 12, and an analog signal transceiver 13. The access point controller 11 includes a ranging processor 11a performing a CDMA code ranging process for call access, and a resource allocator 11b managing a resource for each AT. The ranging processor 11a controls timing, power consumption, frequency offset of an AT from which the CDMA code is transmitted for the ranging process, and transmits associated information to the AP by using an RNG_RSP message.

The resource allocator 11b manages uplink and downlink radio resources for access, and provides UL_MAP and DL_MAP and an uplink/downlink channel descriptor (UCD/DCD) to the AT 200. The digital signal transceiver 12 may include a transmitter 12a and a receiver 12b that selectively perform transmitting and receiving functions. The receiver 12b receives CDMA codes for a ranging process from a plurality of ATs, and transmits the CDMA codes to the access point controller 11. The transmitter 12a modulates/demodulates an RNG_RSP message transmitted from the access point controller 11, and the analog signal transceiver 13 broadcasts the modulated/demodulated message to the ATs over the air.

An access terminal that requests a ranging process from the access point 100 and responds to the request will now be described.

Figure 5:
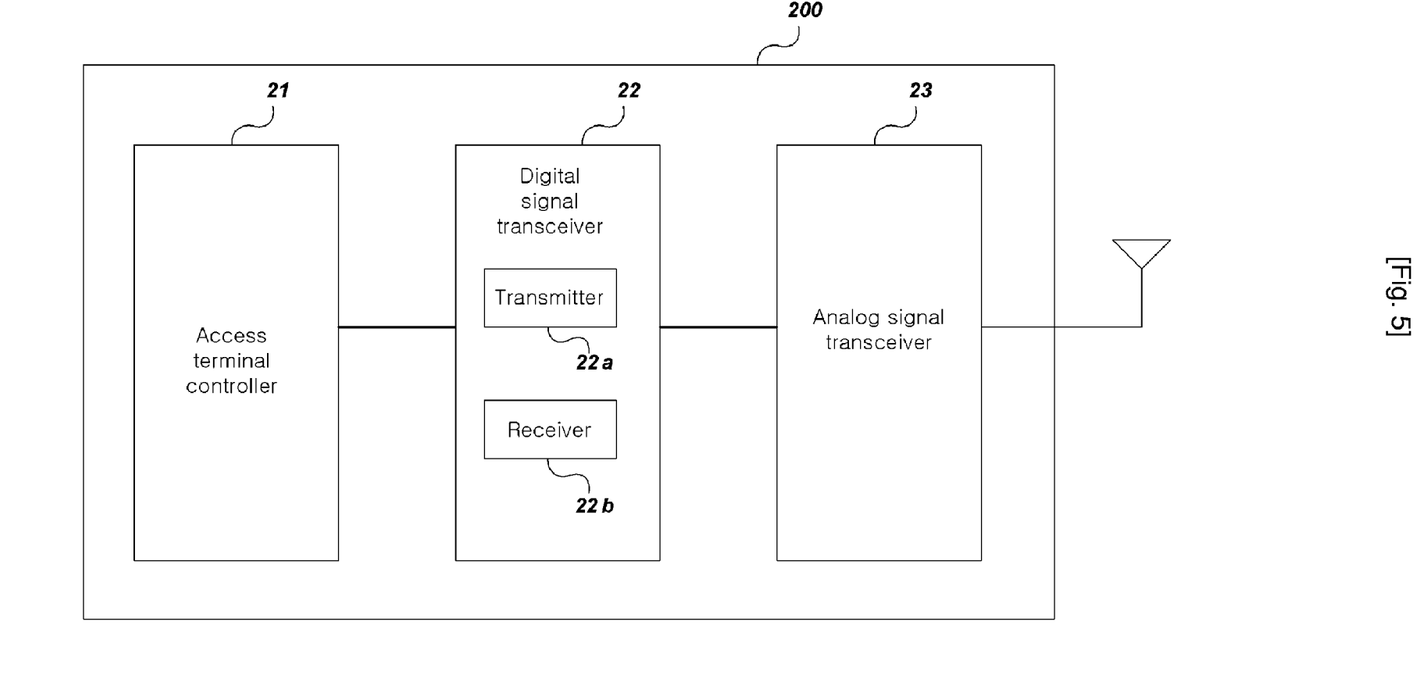
FIG. 5 is a structural diagram of an access terminal according to an embodiment of the present invention.
Figure 6:
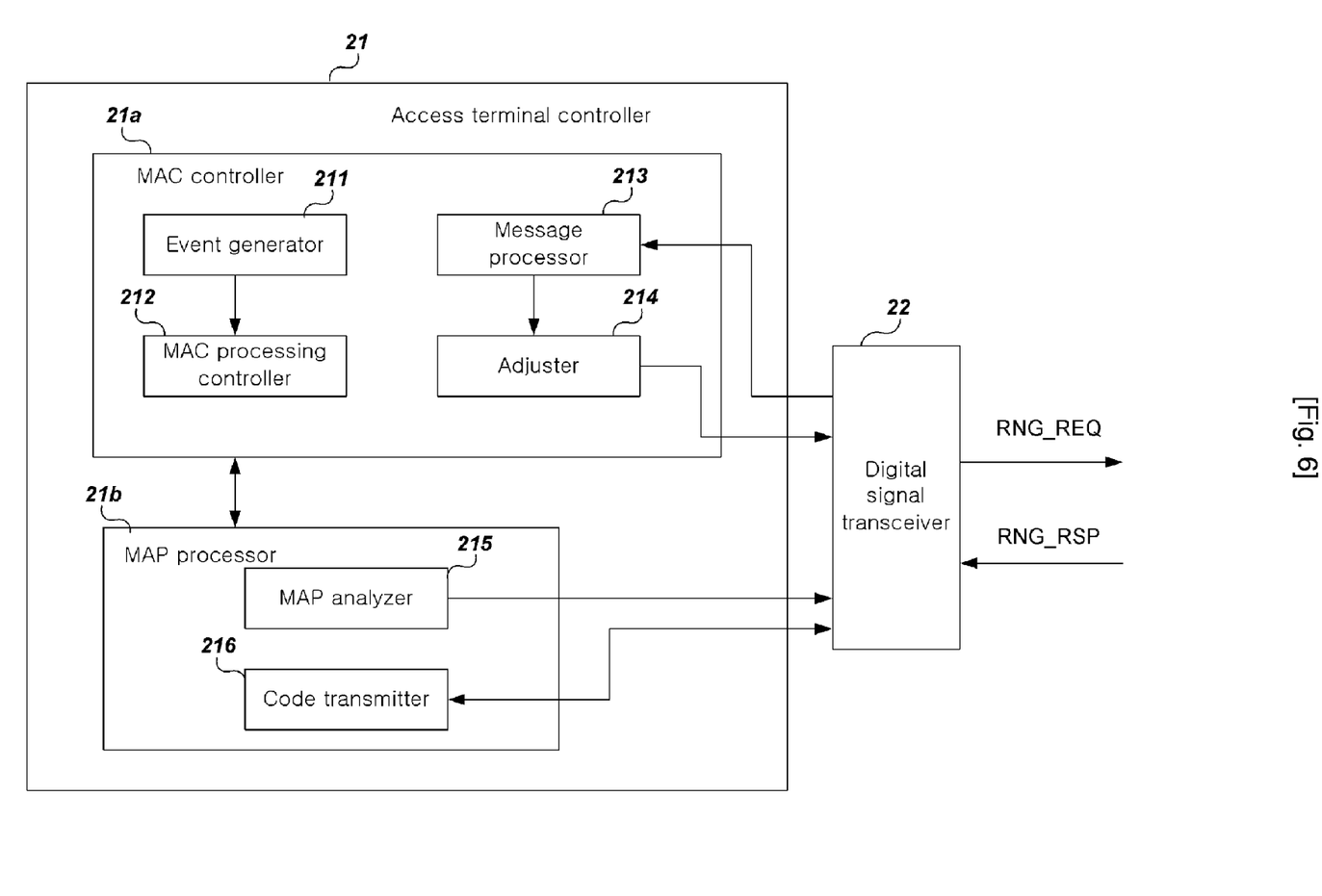
FIG. 6 is a structural diagram of an access terminal controller of FIG. 5.
Figure 7:
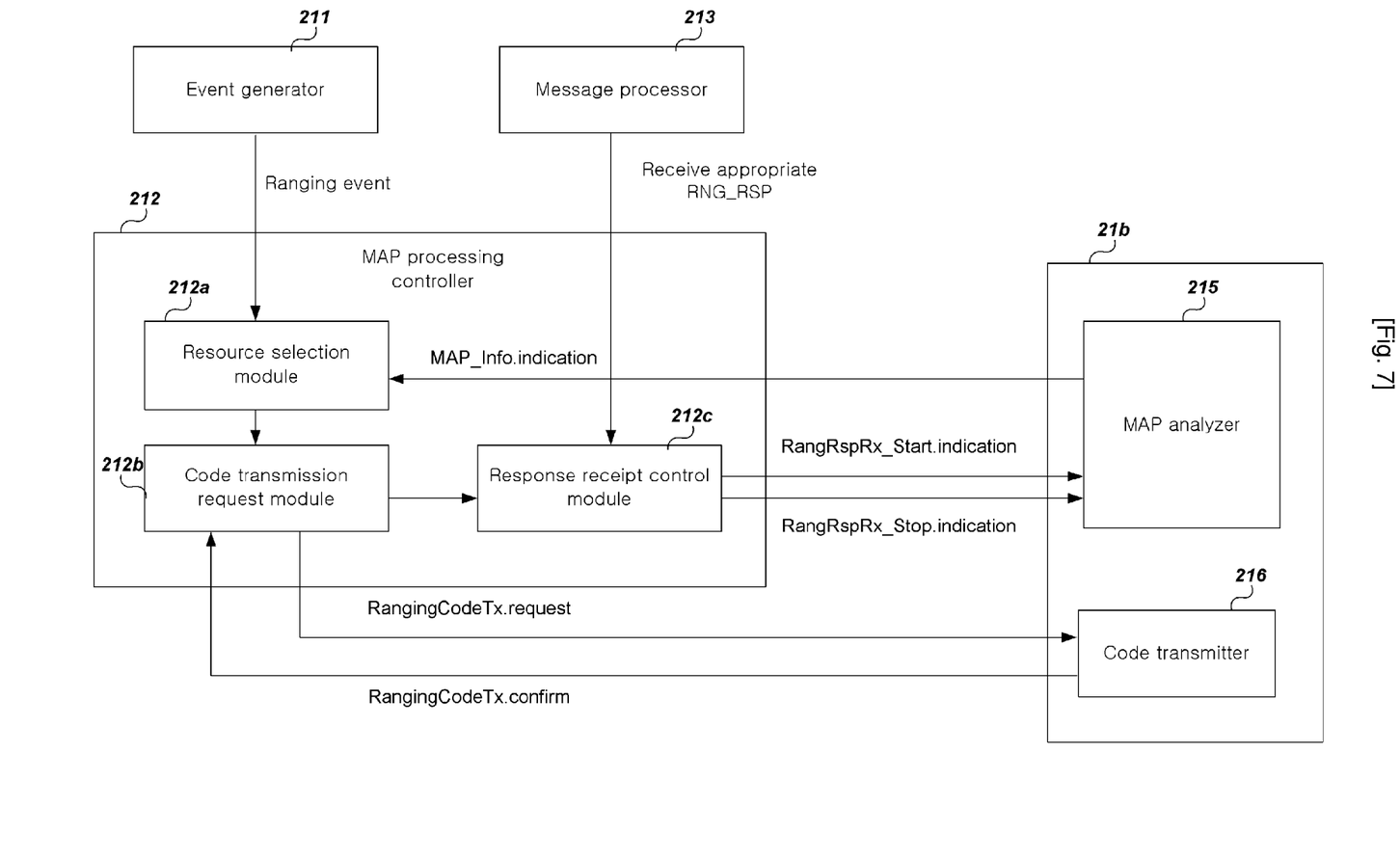
FIG. 7 is a detailed structural diagram of a MAP processing controller of FIG. 6.

FIG. 5 schematically shows a structure of an access terminal, and FIG. 6 and FIG. 7 show a detailed structure of the access terminal according to an exemplary embodiment of the present invention.

The access terminal 200 includes an access terminal controller 21, a digital signal transceiver 22, and an analog signal transceiver 23, as shown in FIG. 5.

The access terminal controller 21 includes a MAC controller 21a and a MAP processor 21b for the ranging process, and the digital signal transceiver 22 includes a transmitter and a receiver that transmits/receives a digital signal. The analog signal transceiver 23 processes a modulated/demodulated digital signal and transmits the processed digital signal over the air.

The access terminal controller 21 may further include a plurality of devices for transmitting, receiving, and processing data from/to the access point 100, in addition to the MAC controller 21 and the MAP processor 21b. The devices are well-known to those skilled in the art, and thus will not be described.

The MAC controller 21a includes an event generator 211 generating an ranging event at predetermined intervals; a MAP processing controller 212 selecting information on a CDMA code, an uplink sub-channel number, and a symbol number according to the generation of the ranging event, transmitting the selected information to the MAP processor 21A, and controlling a MAP process for receiving an RNG_RSP message of the MAP processor 21b; a message processor 213 detecting an RNG_RSP message that appropriately responds to a ranging request of the corresponding access terminal from among RNG_RSP messages transmitted to the digital signal transceiver 22; and an adjustor 214 transmitting information, such as transmission power, timing, and frequency offset, included in the RNG-RSP message, to the digital signal transceiver 22 to adjust transmission power, timing, and frequency offset of the access terminal 200, as shown in FIG. 6.

In particular, the MAP processing controller 212 includes a resource selection module 212a selecting a given CDMA code, an uplink sub-channel number, and a symbol number according to the generation of the ranging event; a code transmission request module 212b transmitting information selected by the resource selection module 212a to the MAP processor 21b to request a ranging process for transmission of the corresponding CDMA code; and a response receipt control module 213c transmitting a signal that controls receipt of an RNG_RSP message to the MAP processor 21b. The RNG_RSP message is broadcasted from the AP 100 depending on whether the message processor 213 detects an appropriate RNG_RSP message, as shown in FIG. 7.

The MAP processor 21b includes a MAP analyzer 215 and a code transmitter 216, as shown in FIG. 6. The MAP analyzer 215 receives and analyses UL-MAP and DL-MAP provided by the AP 100, and transmits a forward error correction (FEC) and information on a sub-channel number and a symbol number to the digital signal transceiver 22 for transmitting/receiving messages. The code analyzer 216 transmits the CDMA code, the sub-channel number, and the symbol number for the ranging process provided by the MAC controller 21a at a given time to the digital signal transceiver 22 to control the CDMA code to be transmitted to the AP 100.

The digital signal transceiver 22 broadcasts an RNG_RSP message provided by the access terminal controller 21 over the air, and transmits an RNG_RSP message transmitted from the AP 100 to the access terminal controller 21.

The above-described access point, digital signal transceivers 12 and 22, and analog signal transceivers 13 and 23 are already well known to those skilled in the art, and therefore will not be described.

A ranging method will now be described in more detail on the basis of the above-described structures.

Figure 8:
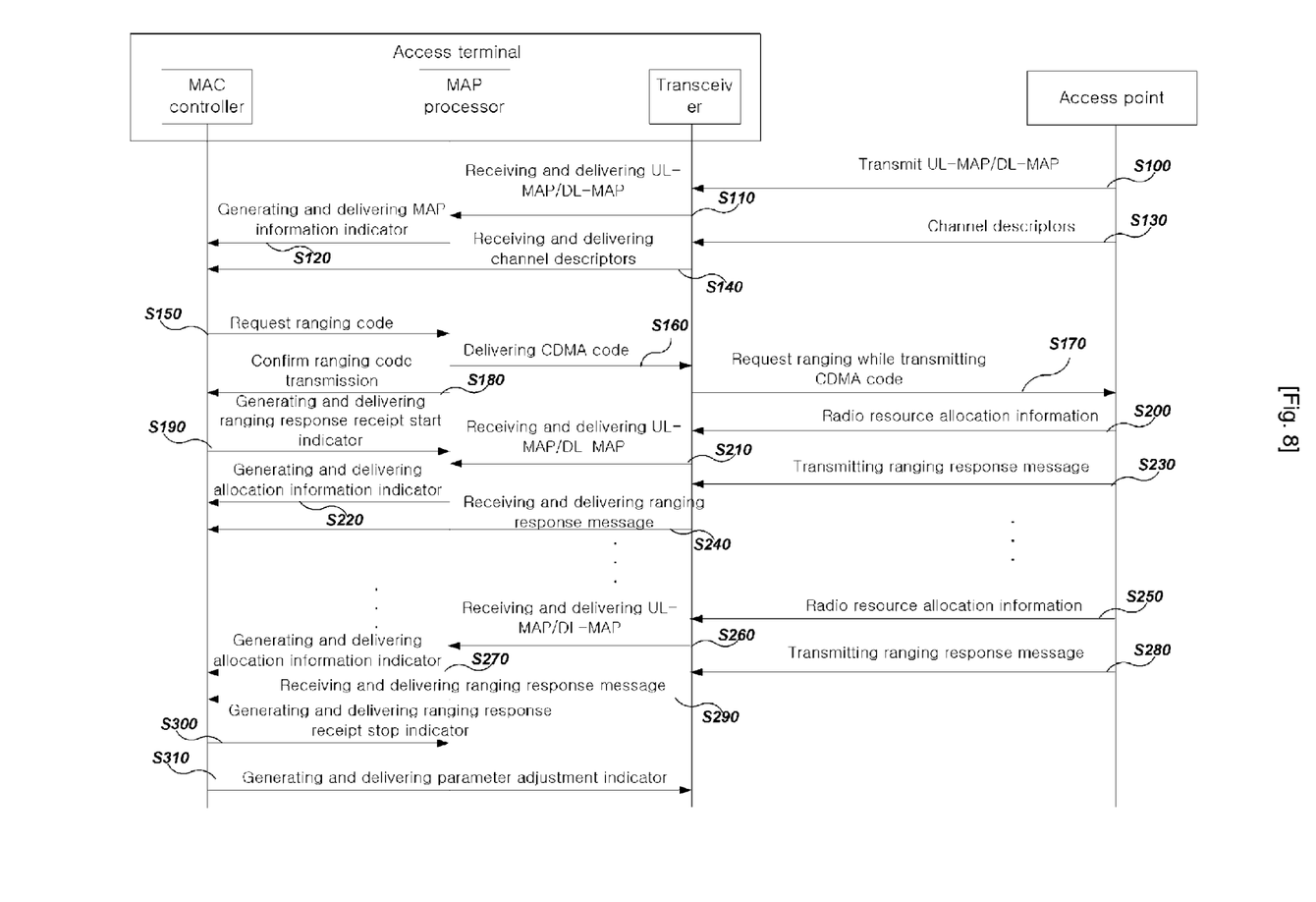
FIG. 8 is a flowchart illustrating a ranging process according to an embodiment of the present invention.

FIG. 8 is a flowchart illustrating a ranging process according to an embodiment of the present invention.

The resource allocator 11b of the access pointer 100 transmits the UL-MAP for data transmission in each AT and the DL-MAP for data receipt in each AT through a broadcasting channel in step S100. The UL-MAP/DL-MAP transmission is performed in each frame.

The MAP processor 21b of the AT 200 receives and stores the UP-MAP/DL-MAP transmitted through the digital signal transceiver 22 in step S110, and requests a ranging process by using the UL-MAP stored therein.

The MAP processor 21b analyses the received DL-MAL/D-MAP, and transmits MAP-related information (particularly an uplink resource and a frame number allocated for the ranging process) to the MAC controller 21 through a MAP information indicator (MAP_Info. Indication), in step S120.

When the resource allocator 11b of the access pointer 100 transmits channel descriptors (including a UCD and a DCD) that describe characteristics of the physical layer according to characteristics of the uplink/downlink in step S130, the MAC controller 21a of the AT 200 stores a range of the CDMA code for the ranging process and a backoff parameter for avoiding collision on the basis of the channel descriptors transmitted through the digital signal transceiver 22 in steps S140 and S150. Herein, the backoff parameter may refer to a waiting time for the next ranging process in the case that the current ranging process has failed.

When the ranging event is generated after the UL-MAP/DL-MAP and the channel descriptors are transmitted and processed for data communication, the MAC controller 21a selects a given CDMA code, an uplink sub-channel number, and a symbol number, and transmits a ranging code transmission request (RangingCodeTx.request) signal that includes the selected information to the MAP processor 21b in step S150.

The MAP processor 21b transmits the CDMA code to the AP 100 by writing the CDMA code, uplink sub-channel number, and symbol number that are transmitted in a given time to a given register, in steps S160 and S170. In other words, the digital signal transceiver 22 transmits the CDMA code and the symbol number to the AP 100 by using an uplink radio resource that corresponds to the sub-channel number among the uplink radio resources on the basis of the information written in the given resister. The MAP processor 21b then transmits a ranging code transmission confirmation (RangingCodeTx.confirm) signal that implies completion of the CDMA code transmission to the MAC controller 21a in step S180.

When the MAC controller 21a receives the RangingCodeTx.confirm signal, the MAC controller 21a stores a current frame number. The MAC controller 21a then transmits a ranging response receipt start indicator (RngRspRx_Start.indication) to the MAC processor 21b to check whether the AP 100 transmits a response message in response to the ranging process request, in step S190.

When the access point 100 receives the CDMA code from the AT 200, the AP 100 transmits the UL-MAP/DL-MAP for each frame in steps S200 through S220. The AT 200 receives an RNG_RSP message broadcasted from the AP 100 on the basis of the transmitted allocation information in steps S230 and S240.

The MAC controller 21a compares CDMA codes, frame numbers, sub-channel numbers, and symbol numbers of the received RNG_RSP messages and the CDMA code, the frame number, the sub-channel number, and the symbol number stored in the MAC controller 21a for the ranging process, and iteratively performs UL-MAP/DL-MAP transmission and the corresponding RNG_RSP message receipt process until it receives an RNG_RSP message containing values (CDMA code, frame number, sub-channel number, and symbol number) that match the stored values in steps S250 to S290.

If the values in the received RNG_RSP message corresponds to the values stored in the AT 200, the MAC controller 21a determines the received RNG_RSP message as an appropriate RNG_RSP message and transmits a parameter adjustment (PhyParamAdjustment) signal that includes information on transmission power, timing, and frequency offset of the received RNG_RSP message to the digital signal transceiver 22, in steps S300 and S310.

Herein, the MAC controller 21a transmits a ranging response receipt stop indicator (RngRspRx_Stop.indication) to the MAC processor 21b to control for no further RNG_RSP message to be transmitted thereto. Accordingly, the MAP processor 21b no longer receives an RNG_RSP message from the AP 100 by stopping analyzing of a given portion of a DL_MAP while receiving and processing the DL_MAP.

For the above-described ranging process, a process in the MAC controller will now be described in more detail.

Figure 9:
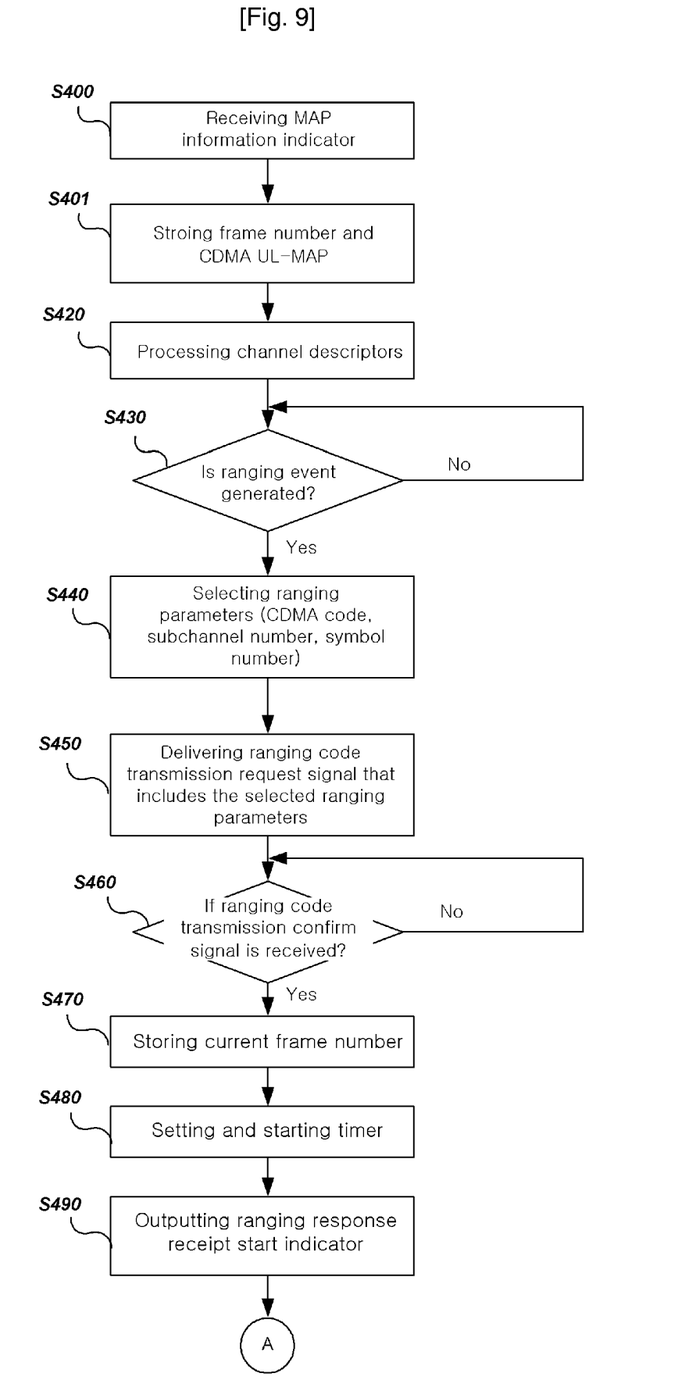
FIG. 9 and FIG. 10 respectively illustrate a flowchart of a MAC controller according to an embodiment of the present invention.
Figure 10:
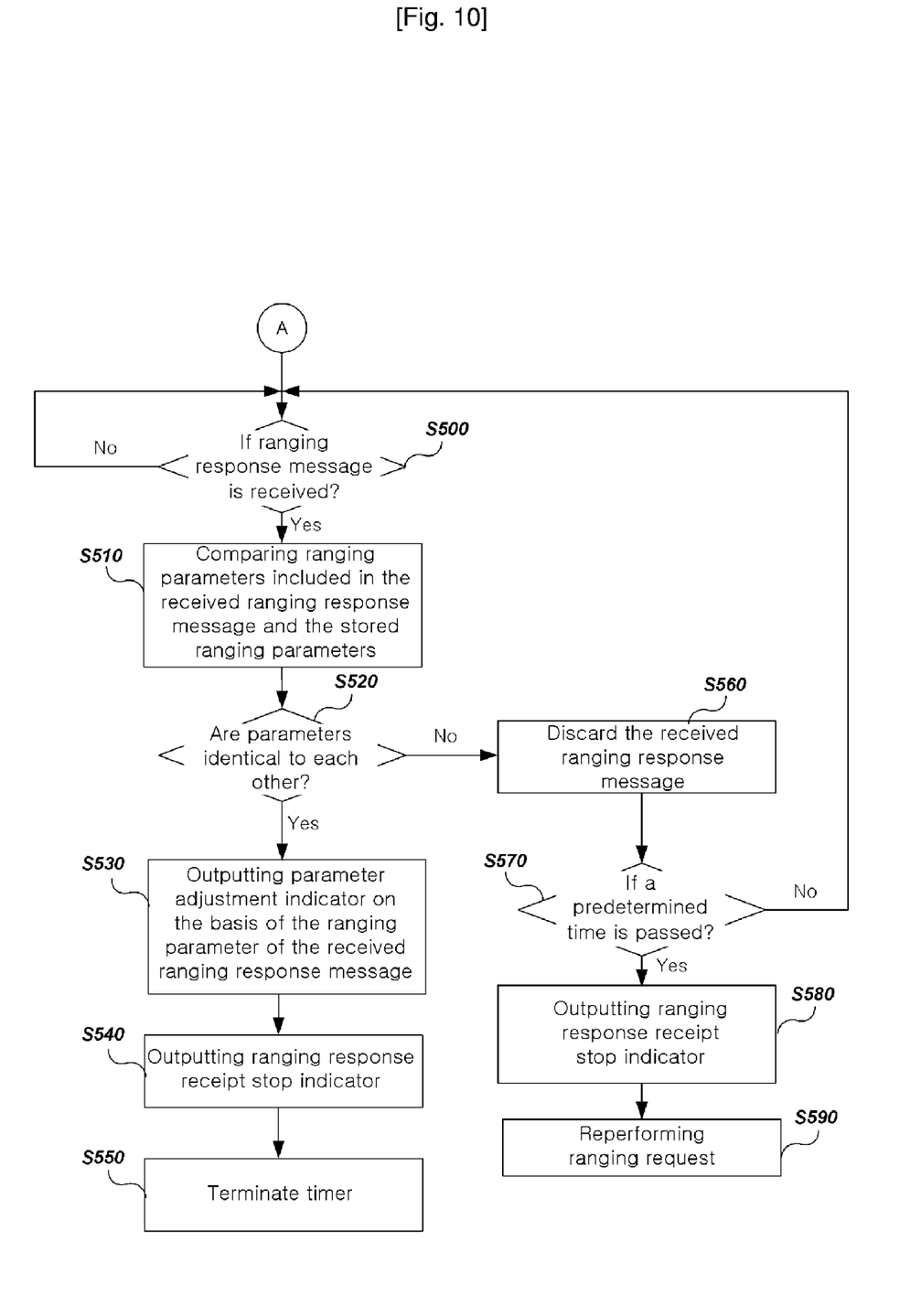

FIG. 9 and FIG. 10 show a ranging process in the MAC controller in detail. A ranging process in the MAC controller 21a will be described in more detail based on the structure of the MAC controller 21a of FIG. 6 and FIG. 7.

As shown in FIG. 9, the resource selection module 212a of the MAC processing controller 212 receives a DL-MAP/UL-MAP from the AP 100 in each frame, and stores a MAC_Info.Indication that includes information on a frame number and an uplink resource allocated for CDMA code transmission in the DL-MAP/UL-MAP, in steps S400 and S410.

In addition, the resource selection module 212a receives channel descriptors (UCD and DCD) broadcasted by the AP 100, and obtains backoff information therefrom to avoid collision with a value range of a CDMA code for a ranging process, in step S420.

When the ranging event is generated by the event generator 211, the resource selection module 212a selects a CDMA code for random ranging within the value range of the CDMA code for the ranging process, selects a given sub-channel number and a symbol number from among uplink radio resources on the basis of the DL-MAP/UL-MAP, and transmits the selected sub-channel and symbol numbers to the code transmission request module 212b in steps S430 and S440. The selected CDMA code and the selected sub-channel and symbol numbers will be called "ranging parameters" hereinafter. The code transmission request module 212b of the MAP processing controller 212 transmits a ranging code transmission request (RangingcodeTx.request) signal to the code transmitter 216 of the MAP processor 21b, together with the ranging parameters, in step S450.

When the code transmitter 216 of the MAP processor 21b transmits a ranging code transmission confirmation message that implies completion of code transmission after the transmission of the selected CDMA code to the access point 100 in step S460, the response receipt control module 212c of the MAP processing controller 212 stores a current frame number in step S470, and sets and starts a timer until receiving an appropriate RNG_RSP message, in step S480. Here, the current frame number is stored to be used as a reference to determine the appropriate RNG_RSP message. A transmitted CDMA code, an uplink channel number, and a symbol number may also be used as the reference. The MAP processor 21b may transmit a CDMA code to a current frame or to a next frame according to a request of the MAP controller 21a. Therefore, the MAP processor 21b transmits the Ranging codeTx.confirm signal to the MAC controller 21a to check and store the current frame number to which the CDMA code is transmitted.

The response receipt control module 212c transmits a ranging response receipt start indicator (RngRspRx_Start.indication) to the MAP processor 21b so as to control the MAP processor 21b to start receiving an RNG_RSP message broadcasted by the AP 100 after starting the timer, in step S490.

The message processor 213 of the MAC controller 21a then receives and processes the RNG_RSP message broadcasted by the AP 100 and transmitted through the digital signal transceiver 22 according to the RngRspRx_Start.indication, and compares the processed RNG_RSP message and the stored RNG_RSP message. For comparison, the message processor 213 extracts ranging parameters from the received RNG_RSP message, and compares the extracted ranging parameters and ranging parameters transmitted from the resource selection module 212a of the MAP processing controller 212 in steps S500 and S510, as shown in FIG. 10.

If the extracted ranging parameters and the transmitted ranging parameters are the same, the received RNG_RSP message is determined to be an appropriate RNG_RSP message for the ranging request. Thus, the controller 214 transmits a parameter adjustment (PhyParam.Adjustment) signal that includes adjusted values of transmission power, timing, and frequency offset to the digital signal transceiver 22 in steps S520 and S530. The response receipt control module 212c transmits a ranging response receipt stop indicator (RngRspRx_Stop.indication) to the MAP processor 21b to stop receiving a further RNG_RSP message in step S540, and stops the timer in step S550.

However, if the extracted ranging parameters and the transmitted ranging parameters are not the same, the message processor 213 discards the received RNG_RSP message, in step S560.

The response receipt control module 212c determines whether a time estimated by the timer exceeds a predetermined time in step S570. If not, the response receipt control module 212c receives a further RNG_RSP message and returns to step S500 to repeat the foregoing processes (steps S500 through S560).

If so, however, the response receipt control module 212c controls the MAP processor 21b to stop receiving a further RNG_RSP message from the AP 100 by transmitting the RngRspRx_Stop.indication thereto even if an appropriate RNG_RSP message is not received, in step S580. As described, when an appropriate RNG_RSP message for an RNG_REQ message of the corresponding AT is not received for a predetermined time, the MAP processor 21b stops receiving further RNG_RSP messages broadcasted from the AP 100 and transmits a CDMA code to re-perform a ranging request process, in step S590.

Operations of the MAP processor 21b transmitting a CDMA code for ranging request according to control of the MAC controller 21a, and the MAP processor 21b controlling a ranging response message receiving operation of the digital signal transceiver 22, will be described in more detail.

Figure 11:
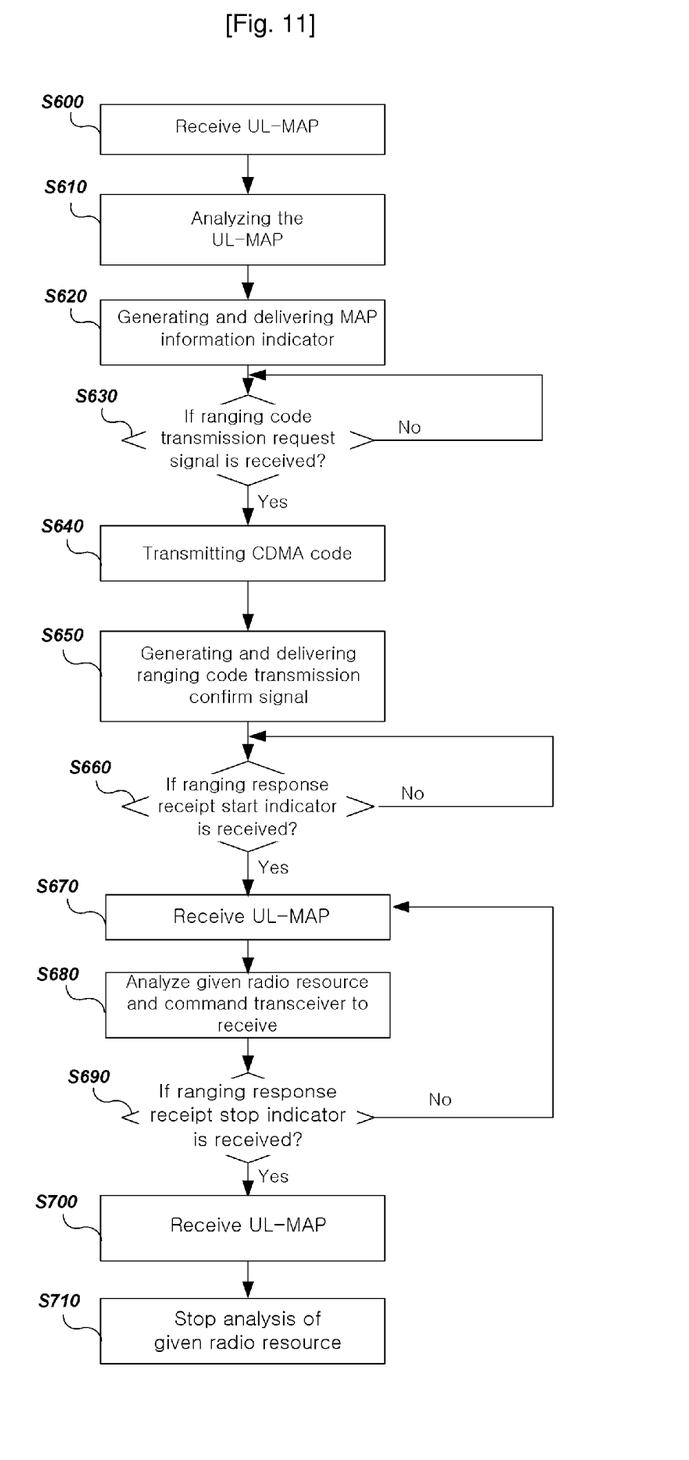
FIG. 11 is a flowchart of a MAP processor according to an embodiment of the present invention.

FIG. 11 illustrates a ranging process in a MAP processor in greater detail.

As shown in FIG. 11, the MAP analyzer 215 of the MAP processor 21b receives UP_MAP/DL_MAP from the AP 100 through the digital signal transceiver 22, and extracts information on a frame number, a sub-channel that indicates an uplink resource allocated for CDMA code transmission, and a symbol range, by analyzing the received UP_MAP/DL_MAP. The MAP analyzer 215 then transmits the extracted information to the MAC controller 21a by using a MAP information indicator (MAP_Info.indication), in steps S600 through S620.

When a RangingcodeTx.request signal is transmitted to the MAP processor 21b to request CDMA code transmission from the MAC controller 21a according to the transmission of the MAP_Info.indication, the MAP processor 21b transmits the CDMA code included in the RangingcodeTx.request signal to the AP 100.

The code transmitter 216 determines whether to transmit the CDMA code to the digital signal transceiver 22 in a current frame or in the next frame to select a proper time for CDMA code transmission. In the case of a Time Division Duplex (TDD)-based radio channel, a CDMA code may be transmitted in the current frame if the RangingcodeTx.request signal is received before uplink transmission. Otherwise, it is preferred to transmit the CDMA code in the next frame.

The code transmitter 216 selects the proper time for the CDMA code transmission and transmits the CDMA code to the AP 100 by writing the transmitted CDMA code and the corresponding sub-channel and symbol numbers to a given register of the digital signal transceiver 22, in step S640. The code transmitter 215 transmits a RangingcodeTx.confirm signal to the MAC controller 21a to inform a frame number to which the CDMA code is transmitted, in step S650.

When the MAC controller 21a receives the RangingcodeTx.confirm signal and transmits a ranging response receipt start indicator (RngRspRx_Start.indication) in step S660, the MAP analyzer 215 of the MAP processor 21b receives UL_MAP and DL_MAP from the AP 100 in step S670, and sets CID 0x0000 (that is, a location of an uplink resource) in a given register of the digital signal transceiver 22 while analyzing the UL_MAP/DL_MAP such that the digital signal transceiver 22 receives an RNG_RSP message broadcasted by the AP 100. Herein, the CID refers to a one-way MAC layer address that identifies connections between an access point and peer layers of the MAC layer of a terminal. The CID 0x0000 is allocated for an initial ranging process by the IEEE802.16a.

The MAP analyzer 215 receives UL_MAP from the AP 100, analyzes a location of a radio resource of CID 0x0000, and writes the analyzed result to the given register of the digital signal transceiver. The MAP analyzer 215 repeatedly performs this process until it receives an RngRspRx_Stop.indication from the MAC controller 21a so as to control the digital signal transceiver 22 to receive an RNG_RSP message broadcasted from the AP 100, in step S690.

However, in the case that the RngRspRx_Stop.indication is transmitted from the MAC controller 21a according to receipt of an appropriate RNG_RSP message, the analyzing process of a radio resource location of the CID 0x0000 is stopped. Consequently, no further RNG_RSP message is broadcasted from the AP 100 since the radio resource location of the CID 0x0000 is not set in the given register of the digital signal transceiver, in step S700.

According to previously described embodiments of the present invention, an efficient ranging process can be realized in a wireless portable Internet system.

In particular, the efficient ranging process can be realized by defining a process of each component for a ranging process and an interface between each component. In addition, a load for processing a ranging response message in an access terminal can be greatly reduced by receiving the ranging response message only for a predetermined period of time.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A ranging method of an access terminal that requests a ranging process from an access point through a wireless network and performs the ranging process according to a corresponding response of the access point, the ranging method comprising:

a) receiving and analyzing a UL-MAP provided from the access point, and extracting information on an uplink resource allocated to the access terminal;

b) selecting an uplink sub-channel number and a symbol number from the UL-MAP when a ranging event is generated;

c) requesting a ranging process by transmitting a Code Division Multiple Access (CDMA) code including the symbol number to the access point through the selected sub-channel number, storing the sub-channel number, the symbol number, and the CDMA code as ranging parameters, and further storing a frame number of a current frame in which the CDMA code is transmitted;

d) receiving a ranging response message broadcasted from the access point;

e) extracting a CDMA code, a sub-channel number, a symbol number, and a frame number from the received ranging response message, comparing the extracted result with the stored ranging parameters including the stored frame number, and controlling transmission power, timing, and frequency offset on the basis of the extracted result when the extracted result and the stored ranging parameters are the same;

f) extracting a CDMA code, a sub-channel number, and a symbol number from the received ranging response message, comparing the extracted result with the stored ranging parameters, and discarding the received ranging response message when the extracted result and the stored ranging parameters are not the same; and g) terminating the ranging response message receipt operation and performing a) through f) when a ranging response message of which ranging parameters are identical to the stored ranging parameter is not received after a predetermined time, wherein the terminating of the ranging response message receipt operation comprises stopping analyzing of a predetermined portion of a DL_MAP while receiving and processing the DL_MAP.

2. The ranging method of claim 1, wherein in d), a given timer is started as the ranging response receipt operation is started, and in g), the ranging response receipt operation is terminated after a time estimated by the timer exceeds the predetermined time.

3. The ranging method of claim 1, wherein the ranging method is performed by an access terminal in a wireless portable Internet system.

4. The ranging method of claim 2, wherein the ranging method is performed by an access terminal in a wireless portable Internet system.

5. An access terminal that requests a ranging process from an access point through a wireless network and performs the ranging process according to a corresponding response of the access point, the access terminal comprising:
   a transceiver performing signal transmission/receipt with the access point through the wireless network;
   a MAP processor receiving and analyzing a UL_MAP from the access point to extract information on an uplink resource allocated to the access terminal, and transmitting a given CDMA code to the access point through the transceiver according to a ranging code transmission request message; and
   a Media Access Control (MAC) controller generating a ranging event, selecting a given uplink sub-channel number and a symbol number from the UL_MAP according to generation of the ranging event, and outputting the CDMA code and a ranging code transmission request message,
   wherein the MAP processor performs a ranging response receipt operation after the transmission of the ranging code transmission request message, and
   the MAC controller controls the MAP processor to terminate the ranging response receipt operation when a ranging response message for the ranging process request is not received from the access point for a predetermined time and performs a ranging request operation by transmitting the CDMA code to the access point, and
   wherein the MAP processor stops analyzing of a predetermined portion of a DL_MAP while receiving and processing the DL_MAP when terminating the ranging response message receipt operation.

6. The access terminal of claim 5, wherein the MAP processor controls the transceiver to transmit the CDMA code to the access point through the selected sub-channel number according to the ranging code transmission request message, and transmits a ranging code transmission confirmation signal to the MAC controller in response to the CDMA code transmission, and wherein the MAC controller controls the MAP processor and the transceiver to receive the ranging response message according to the ranging code transmission confirmation signal.

7. The access terminal of claim 6, wherein the MAC controller comprises:
   an event generator generating a ranging event;
   a MAP processing controller selecting a CDMA code, an uplink sub-channel number, and a symbol number from a UL-MAP included in a MAP information indicator transmitted to the MAC controller when the ranging event is generated, storing the selected CDMA code, the selected uplink sub-channel number, and the selected symbol number as ranging parameters, and transmitting the ranging parameters and the ranging code transmission request message to the MAP processor;
   a message processor determining an appropriate ranging response message that responds to a ranging request of the corresponding access terminal from among ranging response messages from the transceiver; and
   an adjuster adding transmission power, timing, and frequency offset included in the appropriate ranging response message to a parameter adjustment signal, transmitting the parameter adjustment signal to the transceiver, and adjusting transmission power, timing, and frequency offset of the signal transmitted to the access terminal.

8. The access terminal of claim 7, wherein the message processor determines the ranging response message from the access point as an appropriate ranging response message when a CDMA code, a sub-channel number, and a symbol number of the ranging response message correspond to the stored ranging parameters, and discards the ranging response message when the CDMA code, the sub-channel number, and the symbol number are not the same as the stored ranging parameters.

9. The access terminal of claim 7, wherein the MAP processing controller comprises:
   a resource selection module selecting a given CDMA code, an uplink sub-channel number, and a symbol number from the MAP information indicator when the ranging event is generated;
   a code transmission request module adding information selected by the resource selection module to a ranging code transmission request message, and transmitting the ranging code transmission request message to the MAP processor to enable CDMA code transmission for a ranging process; and
   a response receipt control module outputting a ranging response receipt start indicator to the MAP process so as to control the MAP process to receive a ranging response message broadcasted from the access point when a ranging code transmission confirmation message that informs of completion of ranging code transmission is transmitted to the response receipt control module according to the ranging code transmission request message,
   wherein the response receipt control module selectively outputs a ranging response receipt stop indicator to the MAP depending on whether an appropriate ranging response message is detected by the message processor so as to control a ranging response message receipt operation.

10. The access terminal of claim 9, wherein the MAP processor comprises:
   a MAP analyzer analyzing the UL-MAP to generate a MAP information indicator for message transmission/receipt to the MAP controller, transmitting the MAP information indicator to the MAP controller, and controlling a ranging response message receipt operation of the transceiver according to the ranging response receipt start message and the ranging response receipt stop message from the MAC controller; and
   a code transmitter transmitting a CDMA code transmitted according to the ranging code transmission request message to the access point through the transceiver, and transmitting the ranging code transmission confirmation message to the MAC controller after the CDMA code transmission.

11. The access terminal of claim 9, wherein the response receipt control module starts a given timer after transmitting the ranging response receipt start indicator to the MAP processor, and outputting the ranging response receipt stop indicator when the message processor does not receive an appropriate ranging response message after a predetermined time set by the timer.

12. The access terminal of claim 7, wherein the MAP processing controller records information on a frame to which the CDMA code is transmitted according to the ranging code transmission confirmation message, and the message processor determines that the ranging response message is an appropriate ranging response message when a frame number of a ranging response message transmitted from the access point and the recorded frame number are the same, and a CDMA code, a sub-channel number, and a symbol number extracted from the ranging response message and stored ranging parameters are the same.

13. The access terminal of claim 5, wherein the MAC controller comprises:
   an event generator generating a ranging event;
   a MAP processing controller selecting a CDMA code, an uplink sub-channel number, and a symbol number from a UL-MAP included in a MAP information indicator transmitted to the MAC controller when the ranging event is generated, storing the selected CDMA code, the selected uplink sub-channel number, and the selected symbol number as ranging parameters, and transmitting the ranging parameters and the ranging code transmission request message to the MAP processor;
   a message processor determining an appropriate ranging response message that responds to a ranging request of the corresponding access terminal from among ranging response messages from the transceiver; and
   an adjuster adding transmission power, timing, and frequency offset included in the appropriate ranging response message to a parameter adjustment signal, transmitting the parameter adjustment signal to the transceiver, and adjusting transmission power, timing, and frequency offset of the signal transmitted to the access terminal.

14. The access terminal of claim 13, wherein the message processor determines the ranging response message from the access point as an appropriate ranging response message when a CDMA code, a sub-channel number, and a symbol number of the ranging response message correspond to the stored ranging parameters, and discards the ranging response message when the CDMA code, the sub-channel number, and the symbol number are not the same as the stored ranging parameters.

15. The access terminal of claim 13, wherein the MAP processing controller comprises:
   a resource selection module selecting a given CDMA code, an uplink sub-channel number, and a symbol number from the MAP information indicator when the ranging event is generated;
   a code transmission request module adding information selected by the resource selection module to a ranging code transmission request message, and transmitting the ranging code transmission request message to the MAP processor to enable CDMA code transmission for a ranging process; and
   a response receipt control module outputting a ranging response receipt start indicator to the MAP process so as to control the MAP process to receive a ranging response message broadcasted from the access point when a ranging code transmission confirmation message that informs of completion of ranging code transmission is transmitted to the response receipt control module according to the ranging code transmission request message,
   wherein the response receipt control module selectively outputs a ranging response receipt stop indicator to the MAP depending on whether an appropriate ranging response message is detected by the message processor so as to control a ranging response message receipt operation.

16. The access terminal of claim 15, wherein the MAP processor comprises:
   a MAP analyzer analyzing the UL-MAP to generate a MAP information indicator for message transmission/receipt to the MAP controller, transmitting the MAP information indicator to the MAP controller, and controlling a ranging response message receipt operation of the transceiver according to the ranging response receipt start message and the ranging response receipt stop message from the MAC controller; and
   a code transmitter transmitting a CDMA code transmitted according to the ranging code transmission request message to the access point through the transceiver, and transmitting the ranging code transmission confirmation message to the MAC controller after the CDMA code transmission.

17. The access terminal of claim 15, wherein the response receipt control module starts a given timer after transmitting the ranging response receipt start indicator to the MAP processor, and outputting the ranging response receipt stop indicator when the message processor does not receive an appropriate ranging response message after a predetermined time set by the timer.

18. The access terminal of claim 13, wherein the MAP processing controller records information on a frame to which the CDMA code is transmitted according to the ranging code transmission confirmation message, and the message processor determines that the ranging response message is an appropriate ranging response message when a frame number of a ranging response message transmitted from the access point and the recorded frame number are the same, and a CDMA code, a sub-channel number, and a symbol number extracted from the ranging response message and stored ranging parameters are the same.

* * * * *